United States Patent
Barrow et al.

(10) Patent No.: US 7,194,380 B2
(45) Date of Patent: Mar. 20, 2007

(54) CLASSIFICATION USING PROBABILITY ESTIMATE RE-SAMPLING

(75) Inventors: David Barrow, Great Easton Essex (GB); Maarten Anton Keijzer, Utrecht (NL)

(73) Assignee: Chordiant Software Europe Limited, Middlesex (GB)

( * ) Notice: Subject to any disclaimer, the term of this patent is extended or adjusted under 35 U.S.C. 154(b) by 0 days.

(21) Appl. No.: 10/547,014

(22) PCT Filed: Feb. 20, 2004

(86) PCT No.: PCT/GB2004/000677

§ 371 (c)(1),
(2), (4) Date: Aug. 25, 2005

(87) PCT Pub. No.: WO2004/077343

PCT Pub. Date: Sep. 10, 2004

(65) Prior Publication Data

US 2006/0167655 A1    Jul. 27, 2006

(30) Foreign Application Priority Data

Feb. 28, 2003    (GB) .................................. 0304639.8

(51) Int. Cl.
*G06F 15/00* (2006.01)
*G06F 19/00* (2006.01)

(52) U.S. Cl. ..................................... 702/181
(58) Field of Classification Search ................. 702/181

See application file for complete search history.

(56) References Cited

FOREIGN PATENT DOCUMENTS

WO    WO 00/67194    11/2000

OTHER PUBLICATIONS

Breiman, Leo, "Bagging Predictors", Machine Learning, vol. 24, No. 2, Aug. 31, 1996, pp. 123-140, Kluwer Academic Publishers, Netherlands.
Mitchell, Tom M., Machine Learning, Chapter 3, 1997, McGraw-Hill, pp. 53-72.
Mitchell, Tom M., Machine Learning, Chapter 6, 1997, McGraw-Hill, pp. 154-200.

*Primary Examiner*—John Barlow
*Assistant Examiner*—Sujoy Kundu
(74) *Attorney, Agent, or Firm*—Knobbe Martens Olson & Bear LLP

(57) ABSTRACT

Embodiments of a computer-implemented method of calculating estimates of a joint posterior probability of class membership given combinations of attribute values of a pair of attributes are disclosed. The calculating is performed on the basis of data representing a training set of a plurality of instances defined by attribute values for a plurality of attributes together with a class membership outcome. Embodiments of the method comprise calculating first and second estimates of a posterior probability of class membership given attribute values of a first and second attribute of the pair, respectively, and binning the first and second estimates into a respective plurality of first and second probability range bins. Instances of the training set are mapped to combinations of one of each of the first and second pluralities of probability range bins, and on the basis of the mapping, calculating estimates of a joint posterior probability of class membership.

17 Claims, 14 Drawing Sheets

| Instance | AGE | HOME | REPAY LOAN? |
|---|---|---|---|
| 1 | ≤30 | not own | yes |
| 2 | ≤30 | not own | no |
| 3 | >30 | not own | yes |
| 4 | ≤30 | own | no |
| 5 | >30 | own | yes |
| 6 | >30 | not own | no |
| 7 | ≤30 | own | yes |
| 8 | ≤30 | own | no |
| 9 | >30 | own | yes |
| 10 | ≤30 | own | no |
| 11 | >30 | not own | no |
| 12 | >30 | not own | yes |
| 13 | ≤30 | own | no |
| 14 | ≤30 | own | no |

Fig 1

|       | ≤30  | >30   |
|-------|------|-------|
| Total | 8    | 6     |
| Repaid| 2    | 4     |
| Prob. | 0.25 | 0.667 |

Fig 2a

|       | own   | not own |
|-------|-------|---------|
| Total | 8     | 6       |
| Repaid| 3     | 3       |
| Prob  | 0.333 | 0.5     |

Fig 2b

| Instance | p(repay\|AGE) | p(repay\|HOME) | REPAY LOAN? |
|---|---|---|---|
| 1 | 0.25 | 0.5 | yes |
| 2 | 0.25 | 0.5 | no |
| 3 | 0.667 | 0.5 | yes |
| 4 | 0.25 | 0.333 | no |
| 5 | 0.667 | 0.333 | yes |
| 6 | 0.667 | 0.5 | no |
| 7 | 0.25 | 0.333 | yes |
| 8 | 0.25 | 0.333 | no |
| 9 | 0.667 | 0.333 | yes |
| 10 | 0.25 | 0.333 | no |
| 11 | 0.667 | 0.5 | no |
| 12 | 0.667 | 0.5 | yes |
| 13 | 0.25 | 0.333 | no |
| 14 | 0.25 | 0.333 | no |

Fig 3

| Instance | p range AGE | p range HOME | REPAY LOAN? |
|---|---|---|---|
| 1 | ≤0.333 | >0.333 AND <0.667 | yes |
| 2 | ≤0.333 | >0.333 AND <0.667 | no |
| 3 | ≥0.667 | >0.333 AND <0.667 | yes |
| 4 | ≤0.333 | ≤0.333 | no |
| 5 | ≥0.667 | ≤0.333 | yes |
| 6 | ≥0.667 | >0.333 AND <0.667 | no |
| 7 | ≤0.333 | ≤0.333 | yes |
| 8 | ≤0.333 | ≤0.333 | no |
| 9 | ≥0.667 | ≤0.333 | yes |
| 10 | ≤0.333 | ≤0.333 | no |
| 11 | ≥0.667 | >0.333 AND <0.667 | no |
| 12 | ≥0.667 | >0.333 AND <0.667 | yes |
| 13 | ≤0.333 | ≤0.333 | no |
| 14 | ≤0.333 | ≤0.333 | no |

Fig 4

|  | Total | p range AGE ≤0.333 | >0.333 AND <0.667 | ≥0.667 |
|---|---|---|---|---|
| p range HOME | ≤0.333 | 6 | 0 | 2 |
| | >0.333 AND <0.667 | 2 | 0 | 4 |
| | ≥0.667 | 0 | 0 | 0 |

Fig 5a

|  | Repaid | p range AGE ≤0.333 | >0.333 AND <0.667 | ≥0.667 |
|---|---|---|---|---|
| p range HOME | ≤0.333 | 1 | 0 | 2 |
| | >0.333 AND <0.667 | 1 | 0 | 2 |
| | ≥0.667 | 0 | 0 | 0 |

Fig 5b

|  | Probability | p range AGE | | |
|---|---|---|---|---|
|  |  | ≤0.333 | >0.333 AND <0.667 | ≥0.667 |
| p range HOME | ≤0.333 | 0.167 | - | 1 |
|  | >0.333 AND <0.667 | 0.5 | - | 0.5 |
|  | ≥0.667 | - | - | - |

Fig 5c

| Instance | p range AGE | p range HOME | P (REPAY LOAN) |
|---|---|---|---|
| 1 | ≤0.333 | >0.333 AND <0.667 | 0.5 |
| 2 | ≤0.333 | >0.333 AND <0.667 | 0.5 |
| 3 | ≥0.667 | >0.333 AND <0.667 | 0.5 |
| 4 | ≤0.333 | ≤0.333 | 0.167 |
| 5 | ≥0.667 | ≤0.333 | 1 |
| 6 | ≥0.667 | >0.333 AND <0.667 | 0.5 |
| 7 | ≤0.333 | ≤0.333 | 0.167 |
| 8 | ≤0.333 | ≤0.333 | 0.167 |
| 9 | ≥0.667 | ≤0.333 | 1 |
| 10 | ≤0.333 | ≤0.333 | 0.167 |
| 11 | ≥0.667 | >0.333 AND <0.667 | 0.5 |
| 12 | ≥0.667 | >0.333 AND <0.667 | 0.5 |
| 13 | ≤0.333 | ≤0.333 | 0.167 |
| 14 | ≤0.333 | ≤0.333 | 0.167 |

Fig 6

| Instance | AGE | HOME | p (REPAY LOAN) |
|---|---|---|---|
| 1 | ≤30 | not own | 0.5 |
| 2 | ≤30 | not own | 0.5 |
| 3 | >30 | not own | 0.5 |
| 4 | ≤30 | own | 0.167 |
| 5 | >30 | own | 1 |
| 6 | >30 | not own | 0.5 |
| 7 | ≤30 | own | 0.167 |
| 8 | ≤30 | own | 0.167 |
| 9 | >30 | own | 1 |
| 10 | ≤30 | own | 0.167 |
| 11 | >30 | not own | 0.5 |
| 12 | >30 | not own | 0.5 |
| 13 | ≤30 | own | 0.167 |
| 14 | ≤30 | own | 0.167 |

Fig 7

|  | p (REPAY LOAN) | AGE | |
|---|---|---|---|
|  |  | ≤30 | >30 |
| HOME | Own | 0.167 | 1.0 |
|  | not own | 0.5 | 0.5 |

Fig 8

CLASSIFICATION USING PROBABILITY ESTIMATE RE-SAMPLING

FIELD OF THE PRESENT INVENTION

The present invention relates to a computer-implemented method of generating a model for use in classifying new instance data on the basis of a training set of instance data

BACKGROUND

There are many approaches to generating computer models for use in classifying new instance data where the models are generated on the basis of a training set of instance data—typically historical data. The subject matter falls within the general topic of machine learning, which is the study of computer programs and algorithms that learn from experience. Machine learning approaches are numerous and include such varied approaches as decision tree learning, Bayesian learning (such as the optimal and so-called "naïve" Bayes classifiers and Bayesian networks), neural networks, genetic algorithms and additive models (such as linear or logistic regression, but also including the two Bayes classifiers). For a detailed study of these and other approaches, the reader is referred to 'Machine Learning' by Tom M. Mitchell, 1997, published by McGraw-Hill.

To help understand the various approaches of the prior art and the terminology of this topic, it is helpful to give a concrete example of a particular classification problem. We will also use this concrete example to explain the approach of the present invention. Let us suppose that a bank decides whether or not to grant loans to new applicants depending on an estimation of whether or not the loans are likely to be repaid—ie the problem is to classify new loan applications into two classes: 1) likely to be repaid and 2) not likely to be repaid. The bank has historical records of previous loan applications including whether or not those loans were repaid. The bank wishes to use these records to make its decision on new applications. Thus, the bank wishes to generate a model, on the basis of the historical records, which takes information concerning a new loan application as its input and classifies the application into one of the two classes. The main aim in generating such a model is to maximise its predictive ability.

In machine learning terminology, each loan application (new or historical) is called an instance or a case. The information recorded about instances must be defined in some consistent way. Let us suppose that two facts about the applicant are recorded for each loan application: 1) the age of the applicant (either up to 30 years old, or 31 and over); and 2) whether or not the applicant owns their home. This is a highly simplified example, but it will help to understand the concepts involved. The two facts—age and home ownership—are called attributes or predictors. The particular items of information recorded about each attribute are called attribute values. The dataset of historical instances and outcomes (whether or not the loans were repaid) is called the training dataset. The sought representation of the model to be generated on the basis of the training data set is sometimes called the target function.

Note that the present invention is concerned with generating a model on the basis of the training dataset, rather than performing a full multivariate analysis of the training dataset taking each possible combination of attribute values into account which, although it is relatively straightforward in this oversimplified example with only two attributes and two pairs of attribute values, is computationally intractable in terms of data processing and storage requirements with realistic problems having many more attributes and attribute values.

Some of the approaches to machine learning generate models from the training dataset using a top-down approach—ie starting with the attributes. For example, decision tree algorithms generally begin with the question "which attribute should be tested at the root of the tree?" To answer this question, each attribute is statistically evaluated to determine how accurately it classifies the training dataset. The best attribute is selected for the root node of the decision tree. A branch node is then created for each possible value of this attribute and the training dataset is divided into subsets corresponding to each particular value of the chosen attribute. For each branch node, the remaining attributes are again statistically evaluated to determine which best classifies the corresponding training data subset, and this attribute is used for the branch node. The process is then repeated until all the attributes and possible values are arranged in the form of a decision tree with the statistically most likely classification at each end branch. Thus, the following decision nodes represent an example decision tree model generated for the loan application problem where the age of the applicant was found to be the most predictive attribute:

1) is the age of applicant up to 30 years old?
   if yes then proceed to node 2);
   if no, then proceed to node 3).
2) does the applicant own their home?
   if yes, then classification=unlikely to repay loan;
   if no, then classification=likely to repay loan.
3) does the applicant own their home?
   if yes, then classification=likely to repay loan;
   if no, then classification=unlikely to repay loan.

Decision tree models are hierarchical. One problem with the top-down approach to generating a model is that it divides the training dataset into subsets at each branch node on the basis of attribute values and, thus, the statistical evaluations performed at branch nodes lower down the hierarchy take increasingly smaller subsets of the training dataset into account. The training dataset is successively partitioned at each branch node. Thus, in the model generation process, decisions made at lower levels are based on statistically less significant sample sizes. Decision tree models tend to be inaccurate and overfit the training dataset. Overfitting means that a model accurately predicts the training dataset, but is less than optimal in general. This may be because the training dataset is noisy (ie contains some atypical instances) which result in a somewhat skewed model that, through accurately predicting the noisy training datatset, has a less than optimal predictive ability in the general case. Conversely, underfitting means a model that has less than optimal predictive ability with respect to the training dataset. An underfitted model will not be able to accurately predict all of the instances of the training dataset.

Bayesian networks (or Bayesian belief networks) also employ a top-down approach. A Bayesian network represents a joint probability distribution for a set of attributes by specifying a set of conditional independence assumptions together with a set of local conditional probabilities. A single node in the network represents each attribute. Various nodes are connected by directed arcs to form a directed acyclical graph (DAG) and local probability distributions are determined for each node only on the basis of those nodes which are connected to the node in question by an arc of the DAG directed towards the node in question. The absence of an arc of the DAG directed towards the node in question indicates conditional independence. Like decision trees, Bayesian networks are suited to representing causal relationships between the attributes (represented by the DAG), but this is often supplied a priori rather than determined from the training data set.

Other general approaches to generating models, called additive models, use a bottom-up approach in that they start with the training dataset rather than the attributes. All internal parameters of the model are determined on the basis of the complete training dataset. Logistic and linear regression are examples of additive models. Additive models are not hierarchical. With linear regression, the target function is represented as a linear function of the form:

$$F(x) = w_0 + w_1 a_1(x) + \ldots w_n a_n(x)$$

where x denotes the new instance; $a_i(x)$ denotes the value of the ith attribute of a total of n attributes for instance x; and $w_0 \ldots w_n$ are constants (ie the internal parameters of the model). The parameters $w_0 \ldots w_n$ are estimated by minimising the squared error over all the training dataset. Thus, unlike decision trees and Bayesian networks, all the internal parameters are estimated using the whole dataset. With logistic regression, other methods of determining the internal parameters may be used, though typically they are still estimated using the whole dataset. The optimal and "naïve" Bayes classifiers are also examples of additive models.

However, additive models suffer from the assumption that any pattern existing in the training dataset can be represented by linearly weighting and adding the evidence coming from each attribute individually. While this may be valid where the attributes are independent, additive models fail to represent non-linear patterns that depend on combinations of particular attributes values. To give an illustrative example, using the bank loan problem, let us suppose that a pattern exists in the training dataset—namely, when young people own a house, they are likely to default on the loan, perhaps because they already have problems with paying their mortgage. On the other hand, let us suppose that older people who rent are also likely to default on the loan, perhaps they rent a house because their salary is too low to obtain a mortgage, or perhaps because they previously owned their own home but defaulted on their mortgage repayments. This is a non-linear pattern which cannot be represented with univariate models which determine internal parameters by considering the effect of one attribute at a time. Suppose the distribution of the attributes AGE and HOME from the training dataset of 700 instances are as follows:

| AGE | repaid | defaulted | p (repaid | AGE) |
|---|---|---|---|
| ≤30 | 100 | 200 | 0.333 |
| >30 | 210 | 190 | 0.525 |

| HOME | repaid | defaulted | p (repaid | HOME) |
|---|---|---|---|
| own | 200 | 100 | 0.667 |
| not own | 110 | 290 | 0.275 | where p (repaid|AGE) and p (repaid|HOME) denote the posterior probability distribution for repaid loans in the training dataset given the attribute AGE or HOME respectively.

An additive model, such as logistic regression, will estimate the internal parameters on the basis of individual attributes—ie using a univariate approach. The model may be represented as follows:

| AGE | HOME | p (repaid \| AGE, HOME) = $c_1$*p (repaid \| AGE) + $c_2$*p(repaid \| HOME) |
|---|---|---|
| ≤30 | own | $c_1$*0.333 + $c_2$*0.667 |
| ≤30 | not own | $c_1$*0.333 + $c_2$*0.275 |
| >30 | own | $c_1$*0.525 + $c_2$*0.667 |
| >30 | not own | $c_1$*0.525 + $c_2$*0.275 |

However, this model will fail to discriminate the non-linear patterns described above that exist in the training dataset. Consider the distinction made between younger people who don't own their own home and older people who don't own their own home. The factor based on home ownership, $c_2$*p(repaid|HOME), is the same for both these groups—ie $c_2$*0.275, but the factor based on age, $c_1$*p (repaid|AGE), suggests that older people who don't own their own home are more likely to repay the loan than younger people who don't own their own home—$c_1$*0.525 compared to $c_1$*0.333. But this may actually be wrong. Let us suppose that the patterns suggested above exist in the training dataset, and thus the actual probabilities that are present in the training dataset are represented by the following table, which shows the probability of repaying the loan (calculated using the numbers of repaid loans over the total number of loans) in each of the four categories:

| | own | not own |
|---|---|---|
| ≤30 | 10/100 = 0.1 | 90/200 = 0.45 |
| >30 | 190/200 = 0.95 | 20/200 = 0.1 |

From this table it is clear that younger people who do not own their own home are 4.5 times more likely to repay their loans than older people who do not own their own home. This significant pattern in the data is completely missed by the additive model that suggests that older people who do not own their own home are more likely to repay than younger people who do not own their own home.

Similarly, consider, in the additive model, the distinction made between younger people who don't own their own home and younger people who do own their own home. The factor based on younger age, $c_1$*p(repaid|AGE), is the same for both these groups—ie $c_1$*0.333, but the factor based on home ownership, $c_2$*p (repaid|HOME), suggests that younger people who do own their own home are more likely to repay the loan than younger people who don't own their own home—$c_2$*0.667 compared to $c_2$*0.275. But, given the pattern described above, this is again wrong. It is clear, from the probability table above, that younger people who do not own their own home are 4.5 times more likely to repay their loans than younger people who do own their own home.

In these two cases, the additive model goes wrong because the effect of adding weighted factors for each attribute is to estimate internal parameters on the basis of individual attributes, whereas patterns exist in respect of combinations of particular attribute values. In general, additive models tend to underfit since they cannot represent non-linear patterns.

One object of the present invention is to provide a method and computer program for generating a model, for use in classifying new instance data on the basis of a training set of instance data, which estimates all internal parameters of the model using the evidence of the entire training dataset—ie which does not estimate any internal parameter on the basis of a subset of the training dataset.

Another object of the present invention is to provide a method and computer program, for generating a model for use in classifying new instance data on the basis of a training set of instance data.

Another object of the present invention is to provide a method and computer program, for generating a model for use in classifying new instance data on the basis of a training set of instance data, which is capable of detecting and representing non-linear patterns.

Another object of the present invention is to provide a method and computer program, for generating a model for use in classifying new instance data on the basis of a training set of instance data, which is efficient in terms of processing and memory requirements.

Another object of the present invention is to provide a method and computer program, for generating a model for use in classifying new instance data on the basis of a training set of instance data, which fits the training dataset accurately, without overfitting.

SUMMARY OF THE PRESENT INVENTION

According to one aspect of the present invention, there is provided a computer-implemented method of calculating estimates of a joint posterior probability of class membership given combinations of attribute values of a pair of attributes, the calculating being performed on the basis of data representing a training set of a plurality of instances defined by attribute values for a plurality of attributes together with a class membership outcome, the method comprising:

a) calculating first estimates of a posterior probability of class membership given attribute values of a first attribute of the pair;

b) calculating second estimates of a posterior probability of class membership given attribute values of a second attribute of the pair;

c) binning the first estimates into a plurality of first probability range bins;

d) binning the second estimates into a plurality of second probability range bins;

e) creating a mapping of instances of the training set mapped to combinations of one of each of the first and second pluralities of probability range bins; and f) on the basis of said mapping, calculating estimates of a joint posterior probability of class membership given membership in the combinations of first and second probability range bins.

The method may be used to generate a model for use in classifying data representing a new instance, the model being generated on the basis of data representing a training set of a plurality of instances defined by attribute values for a plurality of attributes together with a class membership outcome by:

a) defining a tree structure comprising one leaf node for each attribute of the plurality of attributes and one or more root/branch nodes;

b) recursively calculating estimates of a joint posterior probability of class membership given attribute values for each attribute of the plurality of attributes by:

for root/branch nodes of the tree, calculating estimates of a joint posterior probability of class membership given combinations of attribute values of attributes corresponding to branch/leaf nodes joined by said root/branch node by performing the above method.

Preferably, when calculating estimates of a joint posterior probability of class membership for said root/branch node, estimates of joint posterior probabilities of class membership previously calculated in respect of one or more branch/leaf nodes joined by said root/branch node are binned into a plurality of probability range bins and memberships of the probability range bins are treated as attribute values.

The calculated estimates of joint posterior probability and generated model of the present invention are advantageously able to:

i) represent non-linear patterns which exist in respect of combinations of particular attribute values;

ii) estimate all internal parameters of the model using the evidence of the entire training set; and iii) fit the training set well.

However, the present invention does not require:

i) a full multivariate analysis of the training set which is computationally inefficient; and ii) any prior assumptions about the types of relationships that may exist between evidence relating to different attributes.

Preferably, an aggregated model is generated on the basis of data representing a training set of a plurality of instances defined by attribute values for a plurality of attributes together with a class membership outcome by:

a) selecting a plurality of subsets of instances of the training set;

b) on the basis of each of the subsets, generating a corresponding plurality of models; and c) combining the plurality of models to produce an aggregated model.

Thus, an aggregated model may be generated which fits the training set well without overfitting.

The number of bins in the pluralities of probability range bins may be determined in dependence on the number of instances in the plurality of instances and, preferably, is in the order of the cube root of the number of instances in the plurality of instances. Thus, with larger numbers of attributes and attribute values, the bivariate calculations preformed result in computational efficiency compared to a full multivariate analysis taking into account all possible combinations of attribute values.

The probability range bins may be distributed on the basis of the population of plurality of instances, preferably using a cumulative binomial distribution function generated on the basis of the population of plurality of instances. Thus, the calculation estimates skewed instance data more effectively.

Further aspects of the present invention are as set out in the appended claims. Other advantages of the present invention will be apparent from the following description. There now follows, by way of example only, a detailed description of embodiments of the present invention in which:

BRIEF DESCRIPTION OF DIAGRAMS

FIG. 1 shows a simplified example of a training dataset having two attributes and two attribute values represented in table form;

FIGS. 2a and 2b show two univariate calculations of the posterior probability of class membership given two possible attribute values for the two attributes of the training dataset;

FIG. 3 shows the a training dataset of FIG. 1 re-indexed using the two calculated posterior probabilities rather than the two attribute values;

FIG. 4 shows the a training dataset of FIG. 3 re-indexed using two posterior probability range bins rather than the posterior probabilities;

FIGS. 5a, 5b and 5c show a bivariate calculation of the joint posterior probability of class membership given the possible combinations of the posterior probability range bins;

FIG. 6 shows the a training dataset of FIG. 4 re-indexed showing the joint posterior probability of class membership as well as the posterior probability range bins;

FIG. 7 shows the a training dataset of FIG. 6 re-indexed showing the joint posterior probability of class membership as well as the attribute values replacing the posterior probability range bins;

FIG. 8 shows the output model generated for the example training dataset;

DETAILED DESCRIPTION OF THE PRESENT INVENTION

Figure 9:
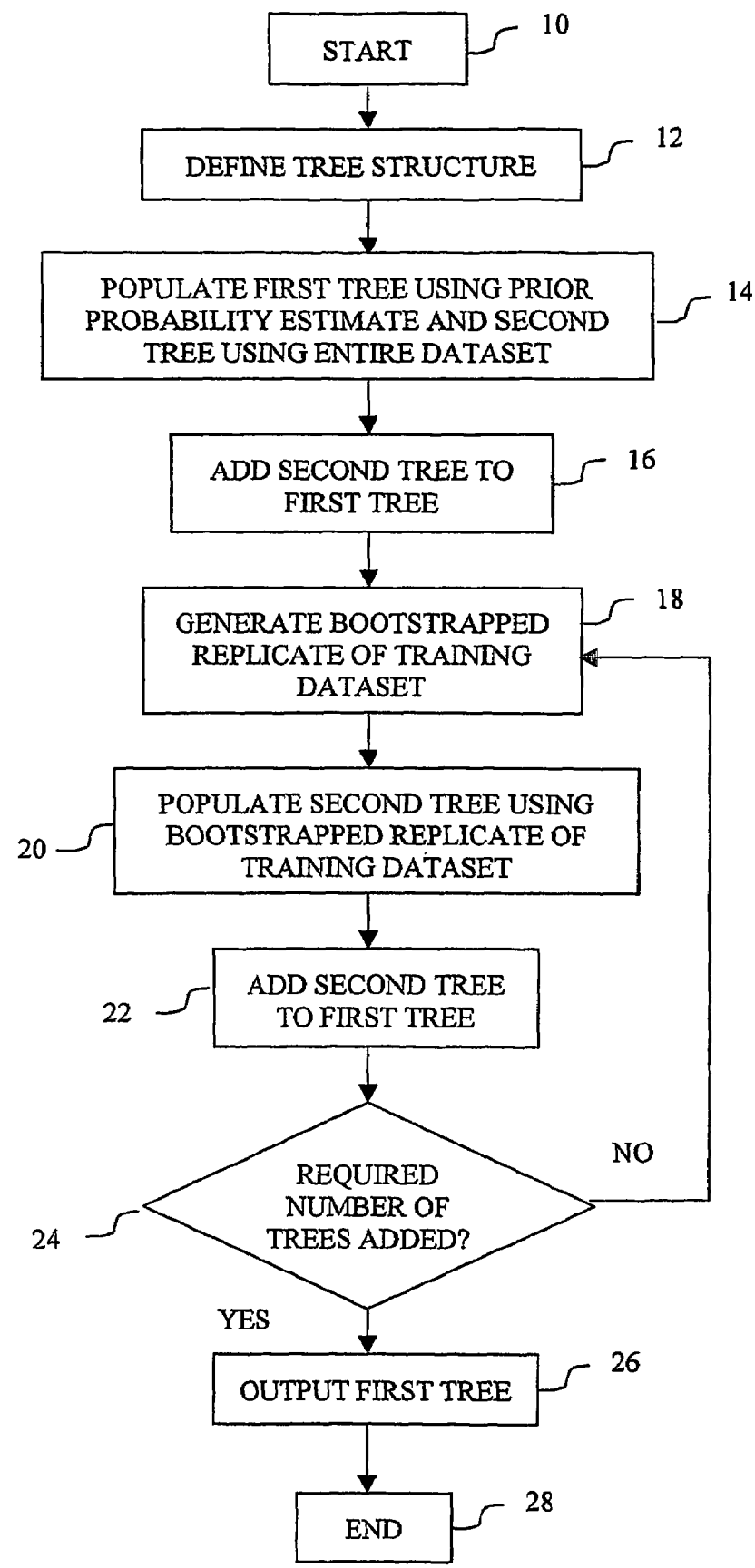
FIG. 9 is a flowchart showing the process of generating a bagged output model for a given training dataset.

The method followed by the present invention is best described by first illustrating it using a further simplified version of the bank loan problem. Recall that there are only two attributes in this problem—AGE and HOME—and these each have only two possible attribute values—'≦30' and '>30', and 'own', 'not own' respectively. Let us now further suppose that there are only 14 instances in the historical training dataset of previous bank loans. This will make it simpler to follow the mathematical computations performed. These instances are set out in the training dataset table of FIG. 1. The instances have been chosen to exhibit similar non-linear patterns to that described above. For each of the two attributes, the method will:

1) estimate the posterior probability of class membership given each respective attribute value, using the entire training dataset;
2) re-index the training dataset table using the probability estimates instead of attribute values;
3) bin each of the probability estimates into a predetermined number of probability ranges; and
4) re-index the training dataset table of instance data using the probability ranges instead of probability estimates.

Steps 1) to 3) effectively reclassify the instance data for each of the two attributes according to the target function we are attempting to model—the probability of class membership. In other words, the indexing reflects the probability that the loan will be repaid which is what we are trying to predict, rather than the values of certain attributes as with prior art approaches. Step 4) codes these probability estimates into a finite number of probability ranges. This step is necessary because the next step is to combine the evidence obtained from both attributes to form a joint probability estimate, and computationally this is more efficient with a finite and limited set of possible index values rather than with continuous or quasi-continuous probability values. Then:

5) the evidence obtained for the attributes (as represented by the membership of each instance in one of the number of probability ranges for the attributes) is combined together to form a joint probability estimate of class membership by estimating the posterior probability of class membership given each observed combination of probability range bins (note that, in general, not all possible combinations of probability range bins will have observed instance data from the training dataset).

Since there are only two attributes in this simple model, this joint probability estimate of class membership is the end of the modelling process—we have generated the model. Key to the process are two facts. Firstly, at each probability estimation step, the evidence coming from the entire training dataset is taken into account. Secondly, the process makes no assumptions about the relationships between attributes, because step 5) combines the evidence obtained in respect of each attribute using a table which is capable of representing non-linear patterns in the data. Thus, the model generated is able to detect patterns in the training dataset which other approaches, such as additive models, are unable to detect because of their implicit assumptions about the linear relationship between the individual attributes.

Let us see how it works with the training dataset table of FIG. 1. For each attribute individually, but using the entire training dataset, p(repay|attribute value), the posterior probability of class membership given each possible attribute value is calculated as follows.

For the AGE attribute, a table is generated (see FIG. 2a) containing counts of 1) the total number of instances in the training datatset having each possible attribute value whether or not the loan was repaid (8 of '≦30', and 6 of '>30'); and 2) the total number of instances having each possible attribute value where the loan was repaid (2 of '≦30', and 4 of '>30'). From this, p(repay|attribute value) is easily calculated by simply dividing the repaid counts by the total counts for each attribute value (giving a probability of 0.25 for '≦30' and a probability of 0.667 for '>30').

Similarly for the HOME attribute, a table is generated (see FIG. 2b) containing counts of 1) the total number of instances in the training datatset having each possible attribute value whether or not the loan was repaid (8 of 'own', and 6 of 'not own'); and 2) the total number of instances having each possible attribute value where the loan was repaid (3 of 'own', and 3 of 'not own'); Form this, p(repay|attribute value) is easily calculated by simply dividing the repaid counts by the total counts for each attribute value (giving a probability of 0.333 for 'own' and a probability of 0.5 for 'not own').

Note that after calculating the estimated probability, the repaid and total counts for each attribute may be discarded. Thus, all that is required to be stored in memory is a vector of length=number of attribute values, for each attribute—ie here 2 vectors of length 2.

Next, the training dataset table is re-indexed using the estimated posterior probabilities instead of attribute values (see FIG. 3). What this has achieved is to replace the attribute value indices to the training dataset table with something more useful—estimates of the target function itself—ie the values that we are actually interested in. Then, the estimated posterior probability values are binned into a number of probability range bins. Let us suppose that 3 probability range bins are used 1) p(repay|attribute value)≦0.333; 2) 0.333<p(repay|attribute value)<0.667; and 3) p(repay|attribute value)≧0.667. The training dataset table is then again re-indexed using the probability range bins instead of the probability estimates (see FIG. 4). This step produces a finite number of possible combinations of probability range bins (3×3=9) by which the instance data may be classified when it comes to combining the evidence from both attributes.

Next, for all observed combinations of probability range bin membership, p(repay|probability range bin values), the joint posterior probability of class membership given the combinations of probability range bin membership is calculated as follows. Three tables are generated (see FIGS. 5a–c). The first table (FIG. 5a) contains counts of the total number of instances, whether or not the loans were repaid, having each possible combination of probability range bin values:

6 of 'p(repay|AGE)≦0.333' AND 'p(repay|HOME)≦0.333';

2 of 'p(repay|AGE)≦0.333' AND '0.333<p(repay|HOME)<0.667';

2 of 'p(repay|AGE)≧0.667' AND 'p(repay|HOME)≦0.333)';

4 of 'p(repay|AGE)≧0.667' AND '0.333<p(repay|HOME)<0.667'; and 0 for all the other possible combination of probability range bin values.

The second table (FIG. 5b) contains counts of the total number of instances, having each possible combination of probability range bin values, where the loans were repaid:

1 of 'p(repay|AGE)≦0.333' AND 'p(repay|HOME)≦0.333';

1 of 'p(repay|AGE)≦0.333' AND '0.333<p(repay|HOME)<0.667';

2 of 'p(repay|AGE)≧0.667' AND 'p(repay|HOME)≦0.333)';

2 of 'p(repay|AGE)≧0.667' AND '0.333<p(repay|HOME)<0.667'; and 0 for all the other possible combination of probability range bin values.

From the first and second tables, the third table containing the estimates joint posterior probability of class membership given each observed combination of probability range bin values (FIG. 5c) is easily calculated by simply dividing the repaid counts by the total counts for each combination of probability range bin values.

Again, note that after calculating the estimated probability, the first (total) and second (repaid) tables may be discarded. Thus, all that is required to be stored in memory is a single square matrix of dimension=the number of probability range bins×the number of probability range bins—ie here a 3×3 matrix.

This table of FIG. 5c represents the generated model in this simplified example. The model fits the training dataset perfectly and accurately represents the non-linear pattern that exists in the data, but which cannot be represented using additive models such as linear or logistic regression. Note that for 5 of the 9 possible combinations of probability range bin values there is no observed instance data in the training dataset and no estimates joint posterior probability of class membership are generated. Where a new instance which falls into one of the cells of the table in FIG. 5c is input into the generated model, the output estimate of class membership may be provided simply as the prior probability of class membership—ie the total number of positive cases in the training dataset divided by the total number of instances—in this case 6/14=0.429. Thus, the model avoids overfitting the dataset, unlike the other approaches capable of modelling non-linear patterns discussed above.

To illustrate how, for each estimated joint probability, the corresponding probability range combination relates back to its corresponding combination of attribute values, let us re-index the training dataset table back to the attribute values—'≦30' and '>30', and 'own', 'not own'. This is shown in FIG. 7. This joint probability estimates can be summarised in the table of FIG. 8. Note that this step of relating back is not is not necessarily performed in practice, but is shown here to illustrate the relation between observed combinations of attribute values and the joint probability estimates. In practice, only the forward calculations are used when classifying a new instance using the generated model. Thus, to classify a given new instance, the particular attribute values of that instance are first mapped to the corresponding probability range bin combination of the model, and the corresponding joint probability estimate (if there is one) is output. If there is no corresponding joint probability estimate (ie because the training dataset does not contain observed instances falling into that probability range bin combination), then the prior probability is output instead, as discussed above. Forward calculations, rather than relating back, avoids the model losing predictive ability where there are many-to-one or many-to-many relationships between attribute value combinations and probability range bin combinations in the training dataset.

Note that if we were to calculate the posterior probability of class membership given each possible combination of attribute values directly (ie using a full multivariate analysis rather than creating an approximated model), we would arrive at the exact same result. One reason why this is not done in all cases is because it is computationally explosive. Where the problem is simple (as with this over simplified problem in which there are only two attributes with only two attribute values each) it is easy enough to calculate the posterior probability of class membership given each possible multivariate combination of attribute values directly. However, consider a more realistic problem with a total of 20 attributes, say 10 attributes each with 2 possible values, 5 attributes with 10 possible values and 5 attributes with 100 possible values. The number of possible attribute combinations is $2^{10} \times 10^5 \times 100^5 = 1.024 \times 10^{18}$. Thus, although it would be optimal to generate a full table using multivariate analysis to provide the posterior probability of class membership given every possible multivariate combination of attribute values, in reality this is computationally intractable in terns of processing and data storage requirements. Furthermore, with typical datasets having many thousands of instances, a model generated using a full multivariate analysis will tend to be very overfitted since the number of observed attribute combinations will be small compared to the number of possible attribute combinations.

However, with the model generation process of the present invention, the number of probability range bins used (Get us call it 'I' for Intervals) need not be large. It is only necessary to ensure that bins are populated with a sufficient number of instances such that when the instances are spread over the matrix of probability range bin combinations, there are a statistically significant number of instances falling into most combinations. It can be shown that $I=\sqrt[3]{n}$ is generally sufficient, where n is the total number of instances in the training dataset (see Appendix Section 7).

Note that with the joint posterior probability calculations of the present invention (such as described above with reference to the tables of FIGS. 5a, 5b and 5c), only bivariate calculations are performed. In other words, even with models having larger numbers of attributes, the evidence coming from attributes is only ever combined using 2D matrices representing bivariate calculations, whereas multivariate calculations for large numbers of attributes would require multi-dimensional matrices. Since, in the present invention, the matrices are only 2-dimensional, the total number of probability range bin combinations, using our estimate above, need only be $(\sqrt[3]{n})^2 = n^{2/3}$. While the present invention does not preclude the use of multivariate calculations, such as the estimation of the joint probability of three attributes simultaneously, the preferred implementation uses bivariate relationships only, as with each added variable the number of intervals used in the calculation needs to be lower. In general, with d attributes, the preferred number of intervals will be $\sqrt[d+1]{n}$.

Next, we will describe how a model may be generated in more realistic cases in which there will typically be many thousands of instances and often many more than two attributes. A key point is that, even though there may be larger numbers of attributes and attribute values for each attribute, the combination of evidence is only ever performed using a repeated bivariate calculations, not multivariate calculations. As will be described below, this is achieved using a hierarchical tree structure with leaf nodes (one for each attribute), a number of branch nodes, and a single root node. Each branch or root node, is only connected to two lower level nodes (branch or leaf). To generate the model, univariate analysis is performed at each of the leaf nodes, and the evidence coming from each univariate analysis is combined at the next level branch node using bivariate anaylsis. Similarly, the evidence coming from each bivariate analysis at each of the lower level branch nodes is combined at the next level branch (or root) node again using bivariate anaylsis. This is achieved by replacing attribute values binned posterior probability estimations from the previous level. The process is repeated going up the tree until, at the root node, the evidence coming from each bivariate analysis at each of the two lower level branch nodes is again combined using bivariate anaylsis to produce the output model.

Thus, it can be seen that by re-estimating the posterior probability of class membership at each successive level and binning instances of the training data set accordingly, the calculations performed at each branch node, and at the root node, are only ever going to be bivariate. Whereas, if the attributes and attribute values were used, the multivariate calculations performed would become increasingly more complex at each successive level until, at the root node, the multivariate calculation would take into account every possible attribute value combination. To return to the concrete example of a problem with a total of 20 attributes, 10 attributes each with 2 possible values, 5 attributes with 10 possible values and 5 attributes with 100 possible values, let us suppose that the training dataset has a million=$10^6$ instances. The total number of probability range bin combinations is $10^{6*2/3}$=10,000. Furthermore, since there will only ever be one root node and 18 branch nodes (ie the total number of attributes −2), the total number of repeated bivariate calculations performed will only be 19. Thus only 190,000 simple probability calculations will need to be performed to generate a single model. This is significantly smaller than the $1.024 \times 10^{18}$ calculations which would be required for a full multivariate analysis.

However, also note that if all of the training dataset is used to create a single model, the output model will have a high capability to fit the training dataset, but may overfit. To avoid overfitting, a technique of bagging (bootstrapping and aggregating) is preferably used. Bootstrapping involves generating a significant number of selected subsets of the training dataset. Preferably, the subsets contain the same total number of instances as the training dataset, but the instances are selected randomly so that some instances are replicated and some missing. These subsets are then used to generate a corresponding number of models estimating the posterior probability of class membership. These models are averaged together (aggregated) to produce the output model. This has the effect of cancelling out the noise in each of the bootstrapped subsets to produce a truer estimate of the posterior probability of class membership. The aggregated model will then be less overfitted to the training dataset and more predictive in the general case.

Other approaches to generating the subsets for aggregation are possible including: a) for each subset, selecting a random number of instances from the training dataset (less than N−the total number of instances in the training dataset); b) selecting N subsets of (N−1) instances, each subset leaving out a different instance of the training dataset; and c) selecting X subsets of about N/X instances, each subset having different instances of the training dataset (note that approach b) above is a special case of approach c)).

Preferably, however, two further models are included in the aggregation Firstly, a model representing only the prior (not posterior) probability of class membership is used. The model is very simple: every probability estimate of class membership for every possible combination of probability range bins at each node of the tree is simply the prior probability of class membership. Throughout the probability range bin combinations at each node of the tree, the "count" of the total number of instances in the entire training dataset is set to 1 and the "count" of the number of positive outcome instances is set to the prior probability estimate. The prior probability of class membership is the total number of positives in the entire training dataset divided by the total number of instances in the entire training dataset. This model underfits the dataset, but it ensures that the aggregated model will output the prior probability for any new instances to be classified which happen fall into those probability range bin combinations with no observed instances in the training data. Where there is observed instance data, however, the single count provided at each probability range bin combination will be statistically insignificant.

Secondly, a model is generated using the entire training dataset (not a selected subset) and included in the aggregation. As mentioned, this model will tend to overfit the training data, but when aggregated together with the models generated from randomly selected bootstrapped subsets and the prior probability "model", it has been found that the aggregated output model will tend to fit the data well.

Let us now describe the model generation process of the present invention for arbitrary numbers of attributes and attribute values. FIG. 9 shows the main process flow for generating a bagged model. The process starts at step 10. At step 12, the hierarchical tree structure of the model is defined. This depends on the number of attributes in the model and need not result in a symmetric tree. The process of defining the tree structure is described below with reference to FIG. 10. What is important for the purposes of bagging is that one tree structure is used for each model to be aggregated. Thus, the models to aggregated may be combined at every node and not just at the root node. Next, at step 14, a first tree structure is created containing only the prior probability estimate to create a first (underfitted) model and a second tree structure is populated with data from the entire training data set to generate a second (overfitted) model, as described above. At step 16, the second tree is added to the first tree. This involves adding the total count numbers and total class member count numbers together at each of the vectors and matrices of the various leaf and branch nodes of each of the two tree structures (note they are stipulated as identical trees so this is possible). Next, at step 18, a bootstrapped replicate of the training dataset is generated using one of the approaches described above. At step 18, this bootstrapped dataset is used to populate the second tree structure to generate a third model. Note that the data of the second tree structure generated for the second model may be overwritten when generating the third model since the data for the second model has already been added to the first tree structure. Thus, only two tree structures need be stored in memory at any one time. Next, at step 22, the second tree is added to the first tree. Again, this involves adding the total count numbers and total class member count numbers together at the vectors and matrices of the various leaf and branch nodes of each of the two tree structures. Next, at step 24, it is determined whether a sufficient number of aggregations have been performed for the purpose of avoiding overfitting. If not, the process returns to step 18, where a further bootstrapped replicate of the training dataset is generated to create a further model and the process continues as before. If yes, the process continues to step 26, where the aggregated tree is output as the final model. The process ends at step 28.

Note that the whole tree is needed for the output aggregated model, not just the root node, although the probability estimates of the root node are what will be output when classifying a new instance. This is because the attribute values of the new instance are used in the forward calculations from the bottom of the tree up to the root node at the top to identify the probability estimate to output. The attribute values of the new instance are mapped to corresponding probability range bins at each of the leaf nodes, which identify a path through successive branch nodes up to the root node to identify the probability estimate to output.

Figure 10:
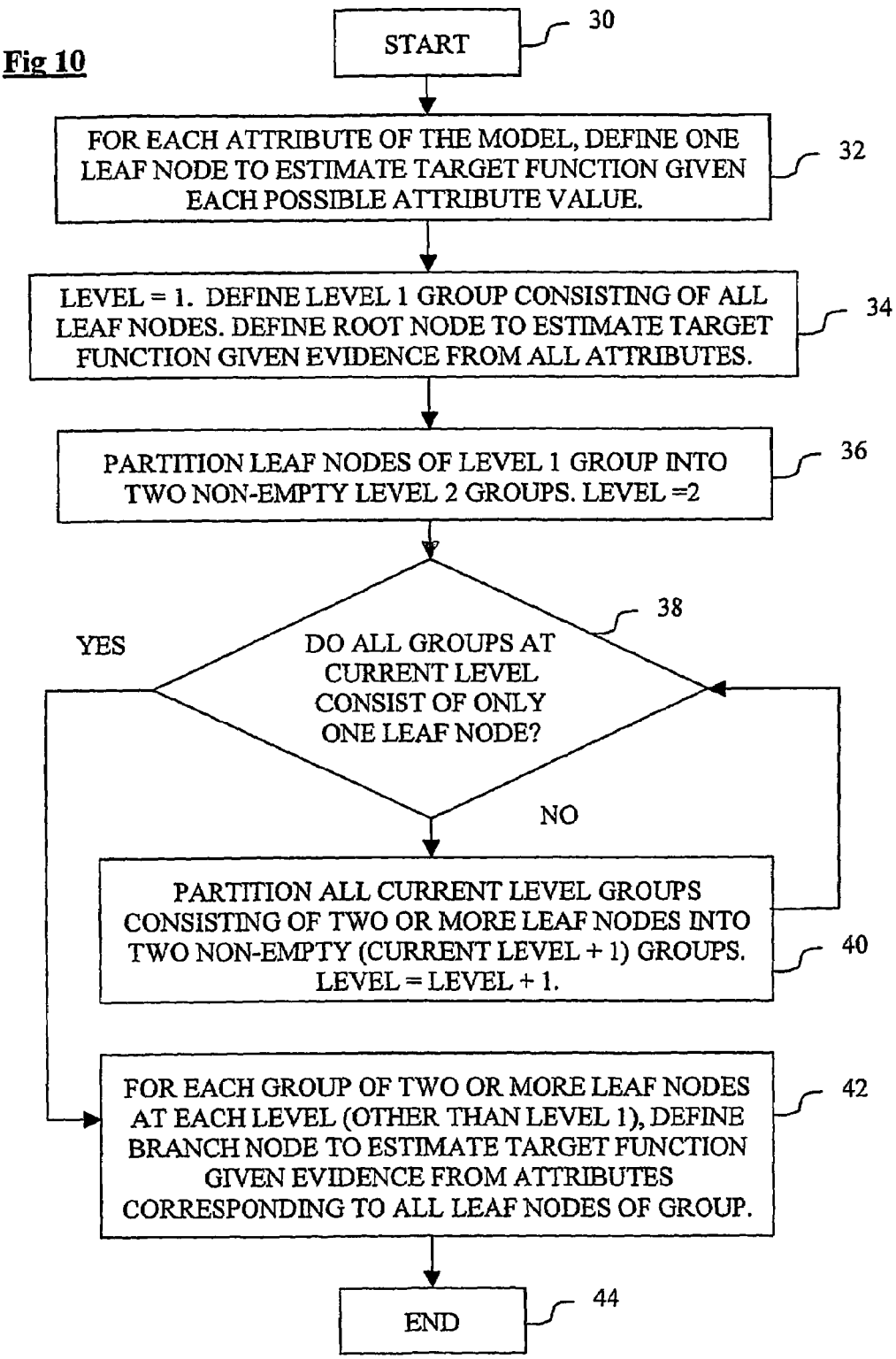
FIG. 10 is a flowchart showing the process of creating a hierarchical tree structure for modelling a given training dataset.

The hierarchical tree structure is defined as shown in the process flow of FIG. 10. The process starts at step 30. At step 32, a leaf node is defined for each attribute of the model. The leaf nodes are used to hold data for estimating a univariate posterior probability of class membership given each possible value of the corresponding attribute. Thus, with our bank loan problem example, the tables of FIGS. 2a and 2b correspond to the two leaf nodes.

Next at step 34 a level 1 group is defined consisting of all the leaf nodes and a single root node is defined to hold data for estimating the posterior probability of class membership given the combined evidence from all the leaf nodes. Next, at step 36, the level 1 group is partitioned into two non-empty level 2 groups. This may be a balanced partition (only if there are an even number of leaf nodes), or it may be an unbalanced partition, in which case a non-symmetrical tree will be generated. The current level is then set to 2. Then, at step 38, it is determined whether all groups at the current level consist of only one leaf node, in which case the partitioning is complete. If so, the process continues to step 42 where a branch node is defined for each group of two or more leaf nodes at each level (other than level 1 which is the root node). These branch nodes are used to hold data for estimating the posterior probability of class membership given the combined evidence from all the leaf nodes in the corresponding group. Thus, with our bank loan problem example, the tables of FIGS. 5a, 5b, and 5c correspond to a branch node combining the evidence of the two leaf nodes of the tables of FIGS. 2a and 2b (although in this simplified problem with only two attributes this branch node is actually the root node, since it is at the top of the hierarchy). The process then ends at step 44.

If, however, at step 38, it is determined that one or more groups at-the current level consist of two or more leaf nodes, the process continues instead to step 40, where all current level groups of two or more leaf nodes are partitioned into two non-empty (current level+1) groups. Again, this may be a balanced partition or it may be an unbalanced partition. The current level is then incremented by 1. The process then returns to step 38 and continues as before.

Figure 13:
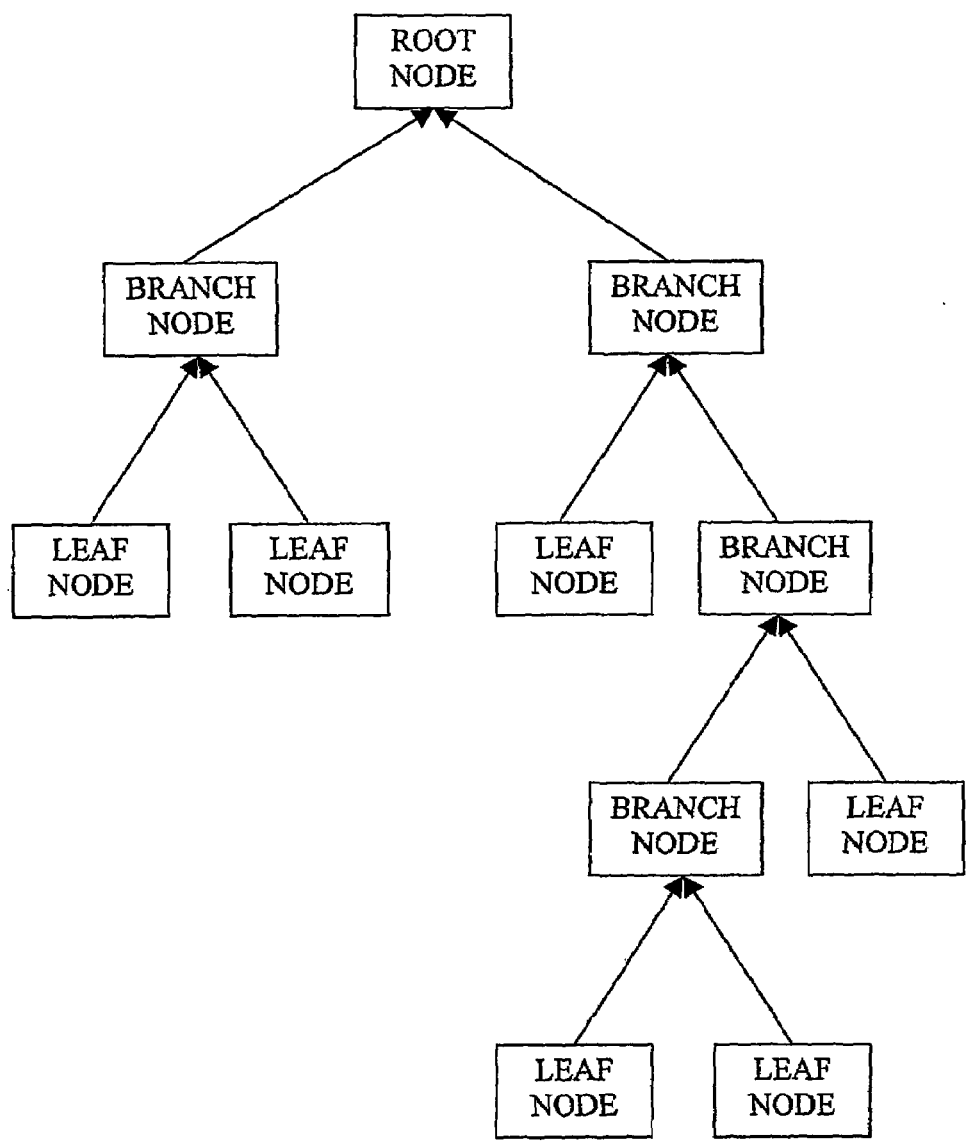
FIG. 13 shows a general non-symmetrical hierarchical tree structure for use in the model generated according to the present invention.

The simplified tree structure of the bank loan problem consists of only a single root node and two leaf nodes. However, in general, with more attributes than two, the effect is to generate a hierarchical tree structure consisting of a single root node, a number of branch nodes at various levels (corresponding to the number of attributes of the model−2) and a number of leaf nodes (corresponding to the number of attributes of the model) terminating at the lowest levels of each branch of the tree. The tree need not be symmetrical and the leaf nodes need not all be at the same level. A general hierarchical tree structure is illustrated in FIG. 13.

Once the tree structure is generated, the leaf, branch and root nodes may be populated with data from the training dataset from the bottom up (leaf nodes, then branch nodes, then root node) to successively estimate and re-estimate (resample) the posterior probability of class membership with each branch node combining the evidence coming from the two leaf or branch nodes upon which it is defined until, finally, the root node combines the evidence coming from all of the leaf nodes to produce the output model. Importantly, note that this does not partition the training dataset, nor does it only consider relationships between certain attributes (ie due to their relationship in the tree structure). This is because the posterior probability estimates at lower levels are only used to index or classify the training dataset for use in re-estimating (re-sampling) the posterior probability at the next level up the hierarchy. At every level, including the root node at the top level, the entire training dataset is used to calculate the posterior probability estimate. Furthermore, evidence coming from multivariate combinations of all of the attributes is ultimately combined at the root node.

Figure 11:
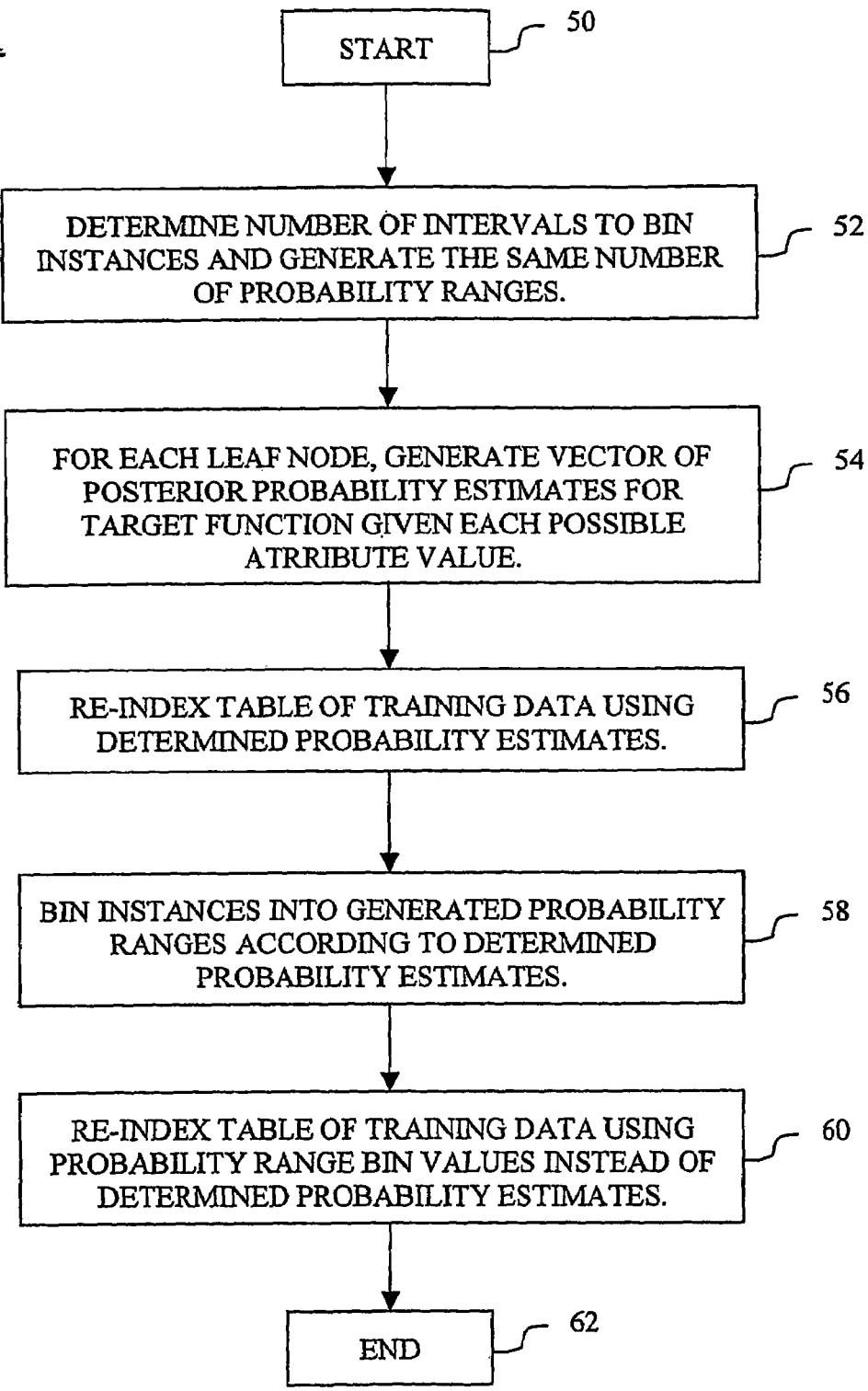
FIG. 11 is a flowchart showing the process of calculating the posterior probability estimates given attribute values at leaf nodes of the hierarchical tree for a given training dataset.

FIG. 11 shows the process flow for populating the leaf nodes to produce a univariate estimate of the posterior probability of class membership. The process starts at step 50. At step 52, the number of intervals in which to bin instances is determined. As described above, $\sqrt[3]{n}$ intervals will normally suffice. A corresponding number of probability ranges are then defined. Note that uniform distribution of probability ranges is not necessary. With skewed training dataset populations, differently distributions are more effective. In particular, a binomial cumulative density function may be used (see Appendix Section 7). Next, at step, 54, for each leaf node, a vector of posterior probability estimates or class membership is created given each possible attribute value. Thus, with our bank loan problem example, the two vectors correspond to the probability rows in the tables of FIGS. 2a and 2b.

Next, at step 56, the table of training data is re-indexed using the determined probability estimates instead of the attribute values. Thus, with our bank loan problem example, the re-indexed table of training data corresponds to the table of FIG. 3. Next at step 58, the instances are binned into the generated probability ranges according to the indexed probability and at step 60, the table of training data is re-indexed using the probability range bin values instead of the determined probability estimates. Thus, with our bank loan problem example, the re-indexed table of training data corresponds to the table of FIG. 4. The process ends at step 62.

Figure 12:
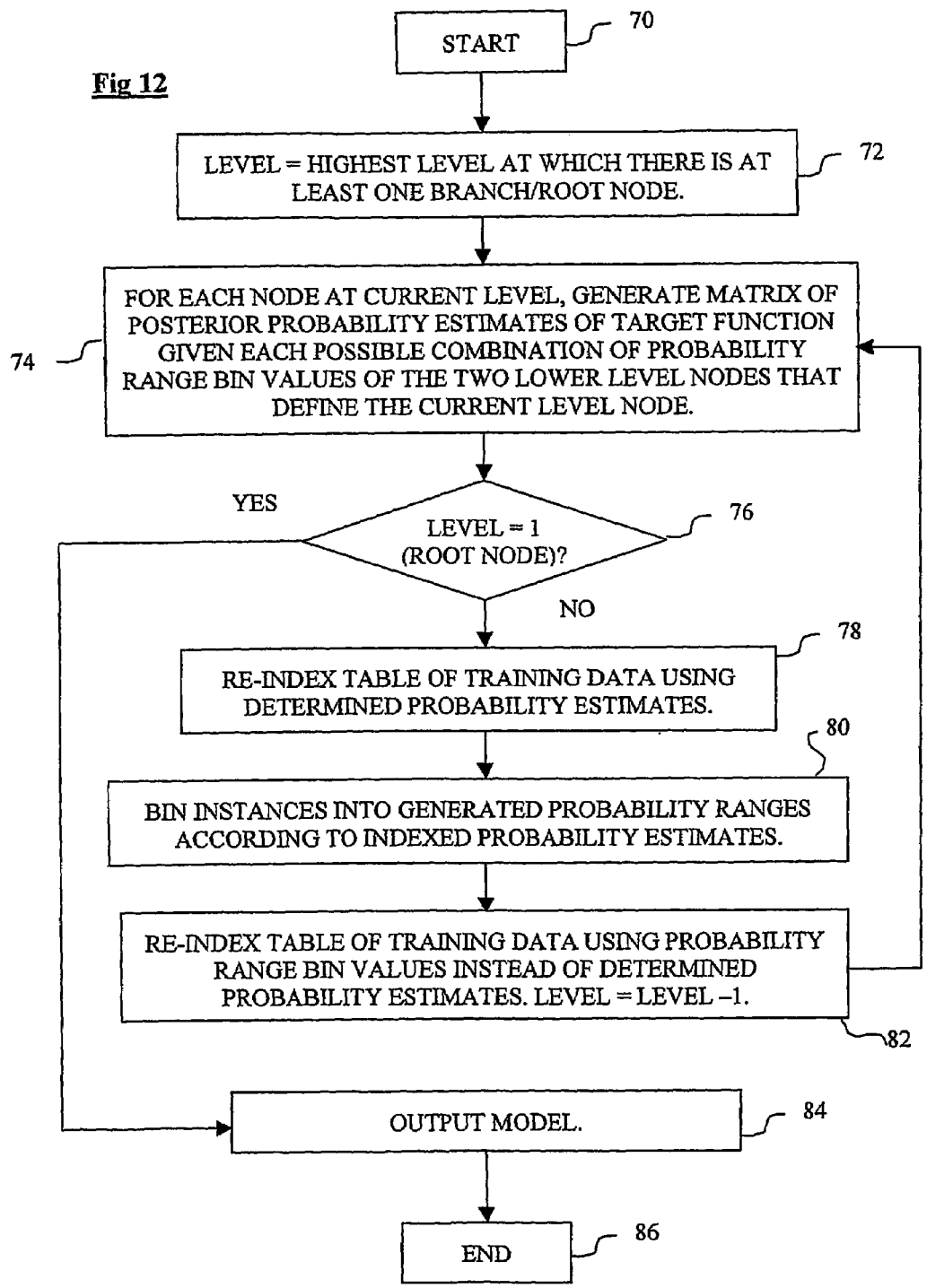
FIG. 12 is a flowchart showing the process of calculating the joint posterior probability estimates given previously estimated posterior probability bins at branch/root nodes of the hierarchical tree for a given training dataset.

FIG. 12 shows the process flow for populating the branch nodes and eventually the root node at each stage producing a multivariate estimation of the posterior probability of class membership. The process starts at step 70. At step 72, the level is set to be the highest level (highest in terms of the integer variable LEVEL determined when defining the tree structure—visually this is actually the lowest level at which there is a branch node—ie the level above the lowest leaf nodes) at which there is at least one branch node (or in simple models, the root node). Next, at step 74, for each node (branch or root) at the current level, a 2D matrix of joint posterior probability estimates or class membership is created given each possible combination of probability range bin values of the two lower level nodes (leaf or branch)—ie a bivariate calculation. Thus, with our bank loan problem example, the 2D matrix corresponds to the table of FIG. 5c.

Next, at step 76, it is determined whether the level is 1—ie whether we have reached the root node of the tree. If yes, the process continues to step 84, where the model is output. The process then ends at step 86. However, if the level is not 1, the process continues to step 78 where the table of training data is re-indexed using the newly determined joint probability estimates instead of the previous pair of univariate posterior probability estimates. Next at step 80, the instances are binned into the generated probability ranges according to the re-indexed probability estimates and at step 82, the table of training data is again re-indexed using the probability range bin values instead of the determined probability estimates. The level is then decremented by one (ie visually we are going up the hierarchy) and the process returns to step 4 and continues as before.

The effect of the process flows of FIGS. 11 and 12 is to estimate and successively re-estimate the posterior probability of class membership starting with a univariate calculation of the posterior probability for each leaf node, and continuing with a bivariate calculation combining the evidence from two previous calculations for each branch node going up the tree hierarchy until the root node is reached.

A detailed mathematical explanation of the process of the present invention is set out below. The explanation appearing below also appears in International Application No. PCT/GB2004/000677, filed Feb. 20, 2004, and published as International Publication Number WO 2004/077343 on Sep. 10, 2004, at pages 34–42, which is hereby incorporated by reference in its entirety, including the appendix at pages 34–42.

It will be appreciated that, although the present invention advantageously uses bivariate calculations at branch nodes of the tree, trees may be defined having more than two connections from at least some lower level nodes to branch nodes or the root node. In particular, trivariate calculations may be made at branch nodes of ternary trees, or mixed bivariate/trivariate calculations may be made at branch nodes of mixed binary/ternary trees. In this case multivariate calculations are preformed when combining the evidence coming from two or more lower level nodes and, correspondingly, matrices of higher order than two will be used to perform these calculations.

Furthermore, it will be appreciated that continuous variables (ie floating point numbers) may be taken as input attribute values rather than discrete variables. Typically, a preprocessing step will be performed to discretize the attribute values into a small number of intervals which are then used in the same way as the discrete attribute values described above. A suitable method to use is recursive entropy discretization Furthermore, it will be appreciated that the model generated by the present invention need not predict only membership of binary classes. The model may represent the probabilities of membership of each of multiple classes.

1 SUMMARY

The novel method and implementation consists of a model-structure combined with a method of estimating the parameters in the model structure in such a way that the model robustly estimates:

$$P(t|v)$$

For arbitrary input vectors v. Thus it tries to estimate the probability for the input vector v for class membership. The method constructs a hierarchical model of of binary or higher order interactions, where at each level the posterior distribution $P(t|v)$ is re-estimated for the predictors that are part of the hierarchy.

As an example, consider four predictors labelled $v_1, \ldots v_4$. These are fitted in the model in the following way:

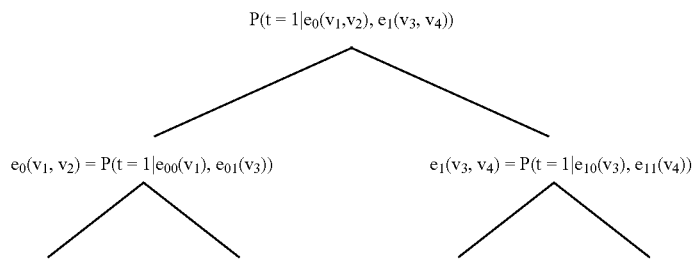

$$e_{00}(v_1) = P(t=1|v_1) \quad e_{01}(v_2) = P(t=1|v_2) \quad e_{10}(v_3) = P(t=1|v_3) \quad e11(v_4) = P(t=1|v_4)$$
$$\qquad | \qquad\qquad\qquad | \qquad\qquad\qquad | \qquad\qquad\qquad\qquad |$$
$$\qquad v_1 \qquad\qquad\qquad v_2 \qquad\qquad\qquad v_3 \qquad\qquad\qquad\qquad v_4$$

Then, each internal node of the tree represents an estimate of the quantity of interest: probability of class membership given the attribute values. The uniqueness of the approach lies in the use of estimated probabilities at lower levels as inputs for the higher levels. It thus combines the evidence (as measured by the posterior distribution) from different predictors at different levels in the tree. These estimates are symbolized by the estimation functions e, and are kept as tables of probabilities.

This type of model is very capable of fitting the training data perfectly and thus overfitting on the data; therefore, a bootstrapping approach is used to use the variance in the interactions to smooth the probability estimates in the inner nodes of the tree (the e tables). For this an addition operator on similarly structured trees is defined. Unlike for instance with bagging [1], this approach does not result in a multitude of models whose outputs are added: a single model of the same complexity as each individual model is build.

The main novelties for this approach are:

A hierarchical model that maps probabilities to probabilities such that each subsequent level considers more input variables and estimates the overall distribution more accurately.

A method for creating the optimal (overfitted) model using a data-sample.

A method for combining several overfitted models into a single model of the same complexity as each single overfitted model. This combined model is used to prevent overfitting.

Methods for controlling the parameters, mainly interval size and grid construction The remainder of this manuscript describes the model and the various methods defined on the model.

2 Preliminaries

Given a task in binary classification with n cases and m predictors, define the input matrix v $$v = \begin{bmatrix} a_{11} & \cdots & a_{1m} \\ \vdots & \ddots & \vdots \\ a_{n1} & \cdots & a_{nm} \end{bmatrix}$$

as an array of indices, such that $$a_{ij} \in [1, \ldots, k_j] \text{ for } i \in [1, \ldots, n] \text{ and } j \in [1, \ldots, m]$$

where $k_j$ is the number of categories present in the j-th attribute. The matrix v thus consists of indices to attribute values. The rows consist of the cases, the columns are the values for the predictors. Also given are target values t that denotes the class membership of an input case:

$$t = [t_1, \ldots, t_n]^T \; t_i \in [0,1]$$

Our interest is in estimating the probability of class membership from the data for arbitrary input sectors x. The prior probability of class membership is then:

$$P(t=1) = \frac{1}{n} \sum t_i$$

For rotational convenience, the possibility of including weights is excluded here, but the model and algorithms below can be trivially extended to include such weights.

Also, subscripting the matrix v will be done such that $v_{i,j}$ denotes a column vector for the j-th column, and in $v_{i,[u_1, \ldots, u_n]}$, the notation will denote the matrix where only the named columns are present. Similarly, the matrix $v_{u,:}$ will define a matrix where the index vector u defines the cases that are selected, keeping the columns intact.

3 The Model

The model consists of a tree structure of the following form.

To create a tree that performs the mapping, $v \rightarrow t$ that thus estimates P(t|x) for unseen x, first define m leaf nodes $[T_1, \ldots, T_m]$, containing a summation of the target values and a number of cases. Thus a leaf node for predictor j contains:

$T_j$:
  g: vector $1 \times k_j$
  c=vector $1 \times k_j$

It can be used to estimate the probability $P(t=1|x_j)$ and is thus a univariate estimate for class membership.

To create a balanced tree for the predictors indexed by $[1, \ldots, m]$, two functions will be used. For arbitrary vectors of indices:

$$\text{left}([u_1, \ldots, u_z]):\text{returns} \begin{array}{l} [u_1, \ldots, u_{z \div 2}] \text{ if } z \div 2 > 1 \\ u_1 \qquad\qquad \text{otherwise} \end{array}$$

and $$\text{right}([u_1, \ldots, u_z]):\text{returns} \begin{array}{l} [u_{z \div 2 + 1}, \ldots, u_z] \text{ if } z \div 2 + 1 < z \\ u_z \qquad\qquad \text{otherwise} \end{array}$$

where ÷ denotes integer division. The functions left and right thus attempt to define a balanced binary tree. For alternatively shaped trees such as skewed trees, the definition can easily be changed. Using these functions and the parameter I, the number of interval, the tree contains:

$T_u$:
  g: matrix $I \times I$
  c: matrix $I \times I$
  $T_{left(u)}^l$
  $T_{right(u)}^r$ It thus recursively includes smaller trees until it ends up with the leaf nodes that are identified by their single index value. The matrices (or vectors in the case of leaf nodes) g and c keep counts of the target values and the case count respectively. The prediction of a node like this given some input is one cell from the matrix g/c. This estimate is again an estimate of the posterior distribution, now for the set of attributes that are found below the node:

$$P(t=1|u)$$

As an example, consider a tree applied on 4 predictors $v_1$, $v_2$, $v_3$ and $v_4$. The model can be visualized as:

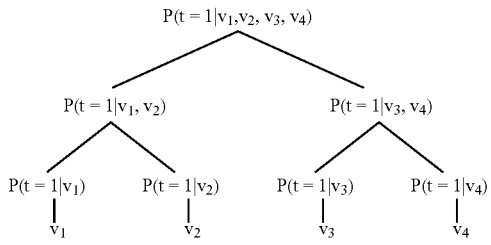

To estimate the posterior probabilities, in each node a finite set of parameters is kept that will estimate a new distribution based on the estimation at the previous level. Creating these models and defining the mapping function from one level to the next are discussed below.

4 Mapping

As each node above the first level outputs their estimate $P(t=1|x)$, a function needs to be defined that maps such a probability to an element of the next level. Specifically a binning procedure needs to be defined that maps real valued values from the range [0.1] to the integer range [1.I]. The simplest of such procedures is a uniform binning procedure, but a procedure based on the Binomial distribution is defined below.

5 Creating the Most Specific Model

The creation routine for this model, initializes the parameters g and c with the data as found in the dataset. Given some binning procedure bin In symbolics:

create($T_u$, v, t): returns a vector of outputs
    l←left (u)
    r←right(u)
    create left branch $o^l$←bin (crete($T_u.T_l^l, v_{i,l}, t$))
    create right branch $o^r$←bin (create($T_u.T_r^r, v_{i,r}, t$))
    for i=1: n
    update target count $T_u.g_{o_i^l,o_i^r} \leftarrow T_u.g_{o_i^l,o_i^r} + t_i$
    update count $T_u.c_{o_i^l,o_i^r} \leftarrow T_u.c_{o_i^l,o_i^r} + 1$
    return an estimate return $$\text{return } \frac{Tu \cdot g_o^i, o^r}{T_u \cdot c_{o^i,o^r}}$$

of P(t=1|u)
And for leaf nodes:
create($T_u$, v, t):
    for i=1: n
    v is now a column vector $T_u.g_{v_i} \leftarrow T_u.g_{v_i} t_i$
    $T_u.c_{v_i} \leftarrow T_u.c_{v_i} + 1$
    return $$\text{return } \frac{Tu \cdot g_v}{T_u \cdot c_v}$$

6 Adding Many Trees using Bootstrapping

Using these definition it is possible to define an addition function. Addition of two structurally identical trees is simply defined as the addition of the g and c parts of the nodes of the trees.

add($T_u$, $U_u$) add second tree to first tree
    $T_u.g = T_u.g + U_u.g$
    $T_c.g = T_c.c + U_u.c$
    recurse The addition function is critical in the algorithm proposed here. Adding two trees will add the evidence (and the mapping created on this evidence) together. Conflicting evidence will cancel out and what is left is the true average of the modelling process. To create the 'optimal' tree on the training data, the call create($T_u$, v, t) will do the trick. It will simply update the matrices with the outcome as it is found in the data. This tree will then be very overfitted to the data, and is not expected to work well with new data.

The approach to overcome this overfitting behaviour that is taken here is to use resampling techniques to create many overfitted trees and use the addition operation defined above to smooth the evidence obtained from the different trees.

The algorithm that is proposed is:
Initialization:
    u←[1, . . . , m]
    create $T_u$ and recursively
    set g←P(t=1)
    and c←1

The tree is thus initialized with a single case that contains the expected target value. This to avoid divisions by zero in the evaluation of the tree and to return the only sensible value for values that are never visited. Then more initialization:
    define new tree
    initialize the matrices on 0 $U_u$←0
    create optimal tree on training set create($U_u$, v, t, w)
    add to master tree add($T_u$, $U_u$)

Now the tree $T_u$ contains an overfitted tree together with a single case containing the average target value. Now we start bootstrapping for b>50 iterations.

for i=1: b
    clear temporary tree $U_u$←0
    create index sample
    of size n×1 s←1+floor(rand(n, 1)*n)
    create bootstrapped tree create($U_u, v_{s,i}, t_s, w_s$)
    add to master tree add($T_u$, $U_u$)

And this concludes the algorithm. By applying many bootstrap samples as many optimal trees are created. Adding all these trees together will smooth the matrices g and c inside the tree using only the variance in the data; it is thought that this procedure creates an 'optimal' average tree.

7 Removing the Internal Parameters

In the definitions above, a leaf nodes operating on variable j contains arrays of length $k_j$, which is the number of groups left over after some preliminary pre-processing not further exemplified. Furthermore, the size of the matrices (depending on I) is another free parameter. This section will present some arguments for automatically performing this grouping inside the algorithm and to give an educated guess to the optimal setting of I.

First we want to estimate the minimum number of cases that is necessary in a leaf node to reliably fill the matrices in the upper nodes. Consider a bin in such a leaf node. If only a single case falls into that bin, during the resampling procedure, the return value will be determined by that single case. If the case is present in a sample, the bin will return the target value of that case; when not present, the bin will not be used. With two cases failing in the bin (supposing that the two cases have opposite target values), the possible outputs of the bin are: empty, 0.0, 0.5 and 1.0. With three or more values falling in the bin, the number of possible outputs produced by a single bin will grow. Now consider that the matrix in the binary node using the leaf node will map the probabilities produced by the leaf into an index $\epsilon[0, I>$. Clearly, if we have two cases falling into the bin at the leaf level and I is larger than three, it is not possible for all the intervals in the upper node to be filled using that bin (as only the intervals that account for probabilities 0, 0.5 and 1.0 will be used).

To make sure that during resampling, the effects of the bin will be able to spread out over the upper level matrix, the number of cases needs to be at least as large as I−1 as in that case (assuming that there are at least one positive and one negative case falling into the bin), the I possible values that can be produced by the bin are: $0/(I-1), 1/(I-1), \ldots (I-1)/(I-1)$. If more than I−1 values fall into a bin, the range of possible probabilities produced by the bin is larger, although the number of possible probabilities produced by the entire leaf during a single sampling session will diminish. Therefore the minimum is:

min-cases-per-bin=$I-1$

In the case of nominal variables, if a symbol is represented with less cases than this value, it should be put in a separate bin, together with other symbols that have this property. These symbols are unreliable to use in modelling.

In the case of numeric (ordinal) variables, the situation can easily arise that every case has a unique numeric value. In that case, a binning procedure needs to be employed that creates bins containing at least I−1 cases. Below some improvements on this simple algorithm will be discussed.

7.1 Determining I

The minimum number of cases per bin in leaf nodes is determined to be I−1. The question now arises: at what value do we need to set I? The same argument applies, for each bin in the matrix for the upper nodes, we need at least I−1 cases so that the nodes even higher up can be filled reliably. As there are I×I bins in such a matrix, and each bin must (in theory) be able to be filled with I−1 cases. together with the existence of n cases in the dataset leads to:

$I \times I \times (I-1) = n$ thus[1]

$I \approx \sqrt[3]{n} + \frac{1}{3}$

[1]This is an approximation as the closed form solution is $$I = 1/6\sqrt[3]{8 + 108n + 12(12n + 81n^2)} \div 2/3$$

$$\frac{1}{\sqrt[3]{8 + 208n \div 12(12n - 81n^2)}} + 1/3$$

For large n this value approaches $\sqrt[3]{n} + \frac{1}{3}$

8 Binning Using the Binomial Distribution

With skewed populations the prior class probability $P(t=1)$ is very close to zero or very close to one. The uniform binning procedure is then susceptible to bin all inputs into a single bin.

Experimentation revealed that this is indeed the case, therefore the following binning procedure is used at this point. After calculating $P(t=1)$, the binning procedure proceeds by using the binomial cumulative density function belonging to this value $P(t=1)$, together with a number for the degrees of freedom df. This represents a virtual case count and governs the spread of the distribution. To obtain a reasonable spread, df is taken from [10, 50].

The cutoff values for the bin are calculated to be those values that correspond to a probability mass of 1/I.

9 An Example

9.1 Inadequacy of Additive Models

Consider a loan-application problem where a bank wants only to give loans to applicants that are likely to pay back the loan. Suppose furthermore that the historical database of the bank recorded two attributes of previous applicants: their age (older or younger than 30) and their housing situation (renting or owning). Now consider that a pattern exist in this data: when young people own a house, they are likely to default on the loan—maybe because they already problems with paying their mortgage. On the other hand, suppose that older people that rent are likely to default on the loan—maybe because they rent a house because their salary is to low to obtain a mortgage, or maybe they previously did own a house but defaulted on that as well—both indicative of defaulting on a loan. Below it will be shown that in such a situation an additive model mill not possibly be able to discriminate properly between 'good' and 'bad' loans.

Suppose that the distribution of the attributes AGE and HOUSE are the following

| AGE | good | bad | p(good | AGE) |
|---|---|---|---|
| ≤30 | 100 | 200 | 0.333 |
| >30 | 210 | 190 | 0.525 |

| HOUSE | good | bad | p(good | HOUSE) |
|---|---|---|---|
| own | 200 | 100 | 0.667 |
| rent | 110 | 290 | 0.275 |

An additive model such as logistic regression that will make predictions using the univariates will come to the following balance:

| AGE | HOUSE | $c_0 \times$ * p(good|AGE) | $c_1 \times$ p(good|HOUSE) |
|---|---|---|---|
| ≤30 | own | $c_0 \times 0.333$ | $c_1 \times 0.667$ |
| ≤30 | rent | $c_0 \times 0.333$ | $c_1 \times 0.275$ |
| >30 | own | $c_0 \times 0.525$ | $c_1 \times 0.667$ |
| >30 | rent | $0c_0 \times .525$ | $c_1 \times 0.275$ |

Consider now the distinction made by this model for young renters versus older renters. Because both groups rent a house, the part of the calculation that relies on the 'renting' attribute value will be the same for both groups. But because the older people in this example are more likely to pay back the loan than young people, older renters will get a higher score than younger renters. This is the effect of adding the evidence of both HOUSE and AGE together in a linear manner.

There was however a pattern in the data. Consider that the actual probabilities that are present in the data are given by the table:

|  | rent | own |
|---|---|---|
| ≤30 | 90/200 | 10/100 |
| >30 | 20/200 | 190/200 | which equals

|  | rent | own |
|---|---|---|
| ≤30 | 0.45 | 0.1: |
| >30 | 0.1 | 0.95 |

From this table it is clear that younger renters are 4.5 times more likely to pay back the loan as are older renters. This is missed by the additive model that assigns a higher score to the older renters.

Something similar goes amiss with distinguishing between young renters and young house owners. Because this time the AGE attribute does not provide any level of discrimination for the additive model, it is the HOUSE attribute that provides the distinction. Also in this case the additive model will favour the wrong group: the young house-owners.

Using an additive model in this setting will lead to many loans being granted to the wrong groups, while ignoring an interesting group with reasonable paying behaviour—the young renters.

9.2 The Method

The generalized model that is the subject of this paper will not have this problem. The univariate probabilities will be used to index a table similar to the interaction table above, and the interaction will be detected. The table that is induced by the invention here would look like:

|  | 0.275 | 0.667 |
|---|---|---|
| 0.525 | 0.1 | 0.95 |
| 0.333 | 0.45 | 0.1 |

REFERENCES

L. Breiman. Bagging Predictors. *Machine Learning* no. 2, pages 123–140, hereby incorporated by reference.

The invention claimed is:

1. A computer-implemented method of calculating estimates of a joint posterior probability of class membership given combinations of attribute values of a pair of attributes and classifying instances of data using the calculated estimates, the calculating being performed on the basis of data representing a training set of a plurality of instances defined by attribute values for a plurality of attributes together with a class membership outcome, the method comprising:
   a) calculating first estimates of a posterior probability of class membership given attribute values of a first attribute of the pair;
   b) calculating second estimates of a posterior probability of class membership given attribute values of a second attribute of the pair;
   c) binning the first estimates into a plurality of first probability range bins;
   d) binning the second estimates into a plurality of second probability range bins;
   e) creating and storing a mapping of instances of the training set mapped to combinations of one of each of the first and second pluralities of probability range bins;
   f) on the basis of said mapping, calculating estimates of a joint posterior probability of class membership given membership in the combinations of first and second probability range bins, wherein the calculated estimates define a model that is stored;
   g) receiving a new instance of data; and
   h) determining a classification for the new instance based on the stored model.

2. A computer-implemented method of calculating estimates of a joint posterior probability of class membership given combinations of attribute values of a triplet of attributes and classifying instances of data using the calculated estimates, the calculating being performed on the basis of data representing a training set of a plurality of instances defined by attribute values for a plurality of attributes together with a class membership outcome, the method comprising:
   a) calculating first estimates of a posterior probability of class membership given attribute values of a first attribute of the triplet;
   b) calculating second estimates of a posterior probability of class membership given attribute values of a second attribute of the triplet;
   c) calculating third estimates of a posterior probability of class membership given attribute values of a third attribute of the triplet;
   d) binning the first estimates into a plurality of first probability range bins;
   e) binning the second estimates into a plurality of second probability range bins;
   f) binning the third estimates into a plurality of third probability range bins;
   g) creating and storing a mapping of instances of the training set mapped to combinations of one of each of the first, second and third pluralities of probability range bins;
   h) on the basis of said mapping, calculating and storing estimates of a joint posterior probability of class membership given membership in the combinations of first, second and third probability range bins;
   i) receiving a new instance of data; and
   i) determining a classification for the new instance based on the stored estimates.

3. A computer-implemented method of generating a model for use in classifying data representing a new instance and classifying the data using the model, the model being generated on the basis of data representing a training set of a plurality of instances defined by attribute values for a plurality of attributes together with a class membership outcome, the method comprising:
   a) defining a tree structure comprising one leaf node for each attribute of the plurality of attributes and one or more root/branch nodes;
   b) recursively calculating estimates of a joint posterior probability of class membership given attribute values for each attribute of the plurality of attributes by:

for root/branch nodes of the tree, calculating estimates of a joint posterior probability of class membership given combinations of attribute values of attributes corresponding to the branch/leaf nodes joined by said root/branch node and classifying new instances of data using the calculated estimates by performing the method of claim 1.

4. A method according to claim 3 wherein, when calculating estimates of a joint posterior probability of class membership for a root/branch node of the tree, estimates of joint posterior probabilities of class membership previously calculated in respect of one or more of the branch/leaf nodes joined by said root/branch node are binned into a plurality of probability range bins and memberships of the probability range bins are treated as attribute values.

5. A method according to claim 3, wherein the tree structure defined is a binary tree, a ternary tree, or a mixed binary/ternary tree structure.

6. A computer-implemented method of generating an aggregated model for use in classifying data representing a new instance and classifying data using the generated model, the model being generated on the basis of data representing a training set of a plurality of instances defined by attribute values for a plurality of attributes together with a class membership outcome, the method comprising:
  a) selecting a plurality of subsets of instances of the training set;
  b) on the basis of each of the subsets, performing the method of claim 3 to generate a corresponding plurality of models;
  c) combining the plurality of models to produce and store an aggregated model;
  d) receiving a new instance of data; and
  e) determining a classification for the new instance based on the stored aggregated model.

7. A method according to claim 1, wherein the number of bins in the pluralities of probability range bins is determined in dependence on the number of instances in the plurality of instances.

8. A method according to claim 7, wherein number of bins is in the order of the cube root of the number of instances in the plurality of instances.

9. A method according to claim 1, wherein the probability range bins are distributed on the basis of the population of plurality of instances.

10. A method according to claim 9, wherein the probability range bins are distributed using a cumulative binomial distribution function generated on the basis of the population of plurality of instances.

11. A computer readable storage medium having stored thereon instructions and data which, when executed by a computer, cause the computer to perform the operations of calculating estimates of a joint posterior probability of class membership given combinations of attribute values of a pair of attributes and classifying an instance of data using the calculated estimates, the calculating being performed on the basis of data representing a training set of a plurality of instances defined by attribute values for a plurality of attributes together with a class membership outcome, and the operations comprising:
  a) calculating first estimates of a posterior probability of class membership given attribute values of a first attribute of the pair;
  b) calculating second estimates of a posterior probability of class membership given attribute values of a second attribute of the pair;
  c) binning the first estimates into a plurality of first probability range bins;
  d) binning the second estimates into a plurality of second probability range bins;
  e) creating a mapping of instances of the training set mapped to combinations of one of each of the first and second pluralities of probability range bins;
  f) on the basis of said mapping, calculating and storing estimates of a joint posterior probability of class membership given membership in the combinations of first and second probability range bins;
  g) receiving a new instance of data; and
  h) determining a classification for the new instance based on the calculated estimates.

12. A computer arranged to calculate estimates of a joint posterior probability of class membership given combinations of attribute values of a pair of attributes and to classify instances of data using the calculated estimates, the calculating being performed on the basis of data representing a training set of a plurality of instances defined by attribute values for a plurality of attributes together with a class membership outcome, and the calculating and classifying comprising:
  a) calculating first estimates of a posterior probability of class membership given attribute values of a first attribute of the pair;
  b) calculating second estimates of a posterior probability of class membership given attribute values of a second attribute of the pair;
  c) binning the first estimates into a plurality of first probability range bins;
  d) binning the second estimates into a plurality of second probability range bins;
  e) creating a mapping of instances of the training set mapped to combinations of one of each of the first and second pluralities of probability range bins;
  f) on the basis of said mapping, calculating and storing estimates of a joint posterior probability of class membership given membership in the combinations of first and second probability range bins;
  g) receiving a new instance of data; and
  h) determining a classification for the new instance based on the computer calculated and stored estimates.

13. A computer-implemented method of generating a model for use in classifying data representing a new instance and classifying data using the generated model, the model being generated on the basis of data representing a training set of a plurality of instances defined by attribute values for a plurality of attributes together with a class membership outcome, the method comprising:
  a) selecting a first pair of attributes of the plurality of attributes; and performing the steps of claim 1 in respect of attributes of the first pair to create a first mapping of instances of the training set and to calculate estimates of a first joint posterior probability of class membership;
  b) generating the model on the basis of the estimates of the first joint posterior probability of class membership and on the basis of the first mapping; and
  c) receiving a new instance of data; and
  d) determining a classification for the new instance based on the model.

14. A method according to claim 13 comprising, prior to step b):
  i) selecting a second pair of attributes of the plurality of attributes different to the first pair of attributes;

ii) performing step a) in respect of the second pair of attributes to calculate estimates of a second joint posterior probability of class membership and to create a second mapping;

wherein the model is generated on the basis of the estimates of the second joint posterior probability of class membership and on the basis of the second mapping.

15. A method according to claim 13, comprising, prior to step b):
   i) selecting a third attribute of the plurality of attributes different to the first pair of attributes;
   ii) calculating third estimates of a posterior probability of class membership given attribute values of a third attribute;
   iii) binning the third estimates into a plurality of third probability range bins;
   iv) binning the estimates of the first joint posterior probability of class membership into a plurality of fourth probability range bins;
   v) creating a second mapping of instances of the training set mapped to combinations of one of each of the third and fourth pluralities of probability range bins;
   vi) calculating estimates of a second joint posterior probability of class membership given each of the probability range bin combinations; and
   wherein the model generated in step h) is generated on the basis of the estimates of the second joint posterior probability of class membership and on the basis of the second mapping.

16. A computer-implemented method of generating a model for use in classifying data representing a new instance and classifying data using the generated model, the model being generated on the basis of data representing a training set of a plurality of instances, each comprising attribute values for at least a first and a second attribute together with a class membership outcome, the method comprising:
   a) calculating values of first estimates of a posterior probability of class membership given attribute values of the first attribute;
   b) calculating values of second estimates of a posterior probability of class membership given attribute values of the second attribute;
   c) mapping data corresponding to instances of the training set to data corresponding to the combined values of the first and second estimates;
   d) calculating values of estimates of a joint posterior probability of class membership given the data corresponding to the combined values of the first and second estimates;
   e) storing the first and second estimates as a model;
   f) receiving a new instance of data; and
   g) determining a classification for the new instance based on the model.

17. A computer-implemented method of generating a model in accordance with claim 16, the method more specifically comprising:
   a) selecting a first and second attribute of the plurality of attributes;
   b) calculating values of first estimates of a posterior probability of class membership given attribute values of the first attribute on the basis of the training set;
   c) calculating values of second estimates of a posterior probability of class membership given attribute values of the second attribute on the basis of the training set;
   d) mapping instances of the training set to data corresponding to combined values of the first and second estimates; and
   e) calculating values of estimates of a joint posterior probability of class membership given the data corresponding to combined values of the first and second estimates; and
   f) generating the model on the basis of the calculated values of estimates of joint posterior probability of class membership.

* * * * *

UNITED STATES PATENT AND TRADEMARK OFFICE
CERTIFICATE OF CORRECTION

PATENT NO. : 7,194,380 B2
APPLICATION NO. : 10/547014
DATED : March 20, 2007
INVENTOR(S) : David Barrow et al.

It is certified that error appears in the above-identified patent and that said Letters Patent is hereby corrected as shown below:

Sheet 11 of 14, Box 36, (Fig. 10), line 2, after "2" insert -- . --

Column 1, line 9, after "data" insert -- . --

Column 2, line 50, delete "datatset," and insert -- dataset, --

Column 10, line 57, delete "terns" and insert -- terms --

Column 10, line 66, delete "(Get" and insert -- (let --

Column 11, line 41, delete "anaylsis." and insert -- analysis. --

Column 11, line 44, delete "anaylsis." and insert -- analysis. --

Column 11, line 49, delete "anaylsis." and insert -- analysis. --

Column 12, line 35, after "aggregation" insert -- . --

Column 14, line 15, delete "at-the" and insert -- at the --

Column 16, line 27, delete "preprocessing" and insert -- pre-processing --

Column 16, line 31, after "discretization" insert -- . --

Column 16, line 46, before "binary" delete "of"

Column 17, line 40, after "construction" insert -- . --

Column 18, line 11, delete "rotational" and insert -- notational --

Column 18, line 25, after "mapping" delete ","

Column 19, line 41, delete "(crete" and insert -- (create --

Column 19, line 59, delete " $T_{u,g_{v_i}}$ " and insert -- $T_{u,g_{v_i}}$ --

Column 21, line 2, delete "failing" and insert -- falling --

Column 21, line 10, after "level" insert -- , --

UNITED STATES PATENT AND TRADEMARK OFFICE
CERTIFICATE OF CORRECTION

PATENT NO. : 7,194,380 B2
APPLICATION NO. : 10/547014
DATED : March 20, 2007
INVENTOR(S) : David Barrow et al.

It is certified that error appears in the above-identified patent and that said Letters Patent is hereby corrected as shown below:

Column 21, line 61, delete " $\sqrt[3]{\sqrt{n}+1/3}$ " and insert -- $\sqrt[3]{n}\div 1/3$ --

Column 22, line 28, delete "mill" and insert -- will --

Column 24, line 53, before "determining" delete "i)" and insert -- j) --

Column 26, line 22, before "the" delete "and"

Signed and Sealed this

Twenty-fourth Day of July, 2007

JON W. DUDAS
*Director of the United States Patent and Trademark Office*